J. G. CASTERAN.
CUTTING APPARATUS FOR SUGAR CANE.
APPLICATION FILED JUNE 23, 1913.
1,116,995.
Patented Nov. 10, 1914.
2 SHEETS—SHEET 1.
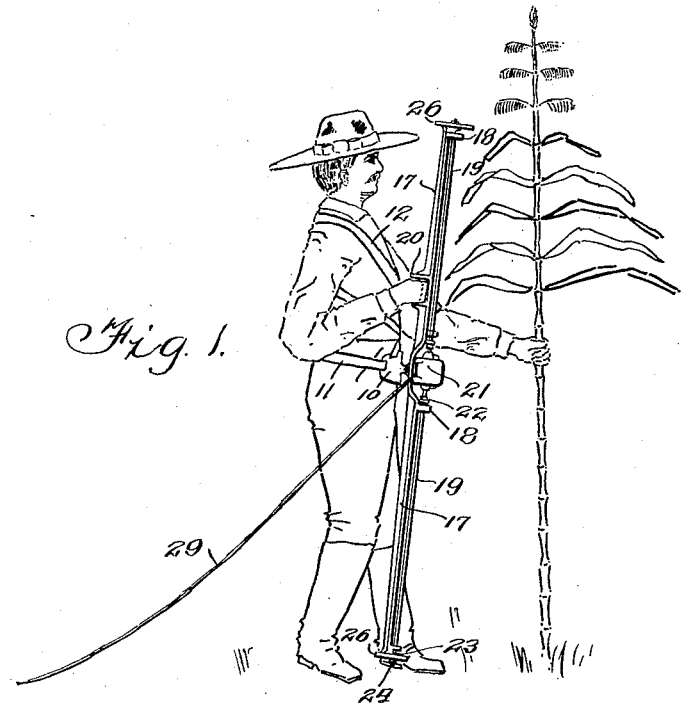
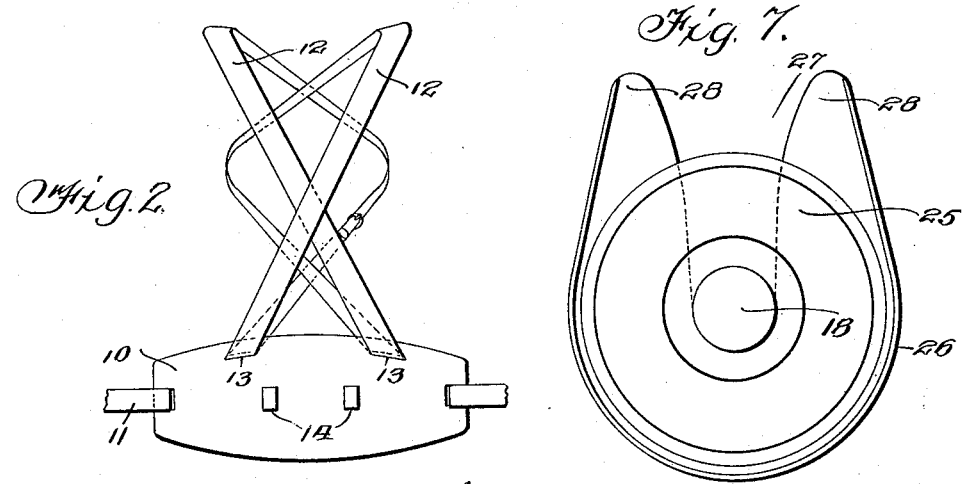
Inventor
Juan G. Casteran.
By Mason Fenwick Lawrence
Attorneys J. G. CASTERAN.
CUTTING APPARATUS FOR SUGAR CANE.
APPLICATION FILED JUNE 23, 1913.
1,116,995.
Patented Nov. 10, 1914.
2 SHEETS—SHEET 2.
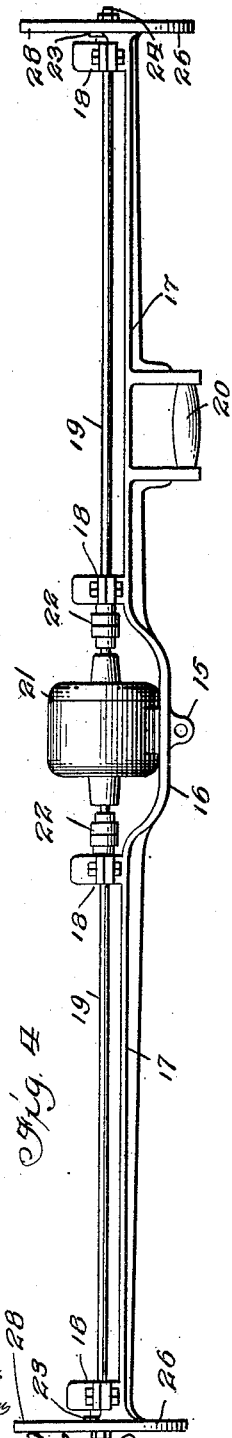
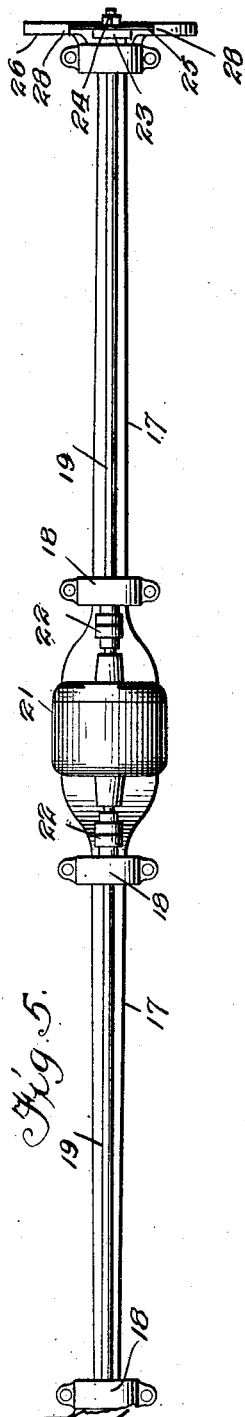
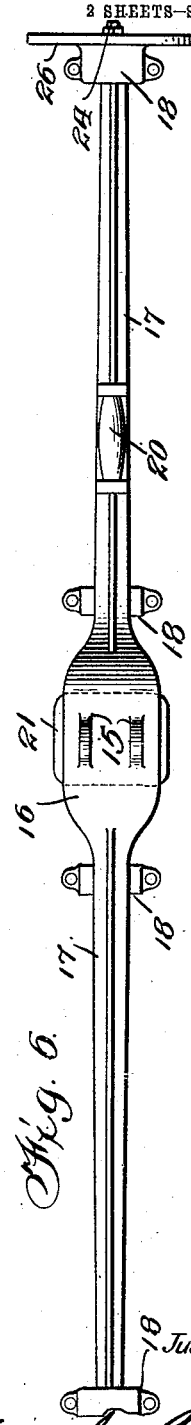
Inventor
Juan G. Casteran

UNITED STATES PATENT OFFICE.

JUAN G. CASTERAN, OF BUENOS AIRES, ARGENTINA.

CUTTING APPARATUS FOR SUGAR-CANE.

1,116,995.      Specification of Letters Patent.     Patented Nov. 10, 1914.

Application filed June 23, 1913. Serial No. 775,317.

*To all whom it may concern:*

Be it known that I, JUAN G. CASTERAN, a citizen of the Argentine Republic, residing at Buenos Aires, Argentina, have invented certain new and useful Improvements in Cutting Apparatus for Sugar-Cane; and I do hereby declare the following to be a full, clear, and exact description of the invention, such as will enable others skilled in the art to which it appertains to make and use the same.

This invention relates to cutting apparatus and more particularly for use in cutting sugar-cane and the like.

It has for an object to provide an efficient cutter for sugar-cane which will permit the sugar-cane being cut as near the ground as is practicable and also permits the severing of the upper end of the cane.

A further object of this invention is the provision of a motor driven cutting means which may be easily carried by an operator.

A further object of this invention is the provision of a cane cutter which may be easily carried by an operator and which may be used without the operator moving from a natural erect position.

A further object of this invention is to provide a cutter which will decapitate a stalk and subsequently cut the stalk in proximity to the ground so that for each stalk the greatest length thereof is had.

A further object of this invention is a provision of a breastplate carried by an operator and to this breastplate is secured a fulcrumed cutter having cutting knives at the ends thereof and a means for rotating said knives.

A further object of this invention is the provision of guards for the cutting knives which guards protect the operator from danger and also serve as guides for directing the cutters on the stalk of sugar-cane or the like.

Further objects will be apparent from the following specification, appended claims and drawings, in which, Figure 1 is a view of the device as in use, Fig. 2 is a front elevation of the breastplate to which the cutter is fulcrumed, Fig. 3 is a plan view thereof, Fig. 4 is a side elevation of the device removed, Fig. 5 is a front elevation thereof, Fig. 6 is a rear elevation thereof, and, Fig. 7 is a plan view of a cutter and guard.

In cutting sugar-cane in large quantities, it is desired that the stalks be cut as near the ground as practicable to produce a saving and as the top of the stalk is subsequently removed it is possible with my invention to decapitate the stalk and cut said stalk from the ground in a single operation.

I provide a portable device which is carried by an operator and is fulcrumed to a base plate to enable the cutting device to be rocked and thereby cause the upper end thereof to remove the top of the stalk, then the lower end to be swung into cutting engagement with the lower end of the stalk and referring to the drawings there is shown a base plate 10 to which a belt 11 is secured at its ends after passing about the waist of an operator and said base plate also has shoulder straps 12 connected therewith which shoulder straps pass forwardly across the front of the body of an operator, over the shoulders across the back of an operator, under the arms and thence across the front of the body to the base plate as shown. This base plate has lugs 14 formed thereon which lugs receive a pintle after passing through ears 15 formed on the frame 16.

The frame 16 comprises an enlarged portion from which extends arms 17 upon which arms are formed bearings 18 to support the shafts 19. These arms are reinforced in the usual manner with flanges, and one of the arms has a handle 20 formed thereon by which the frame is rocked. A motor or other driving medium 21 is secured with the broadened portion of the frame 16 as shown and through the usual couplings 22 the shaft of this motor is connected to the shafts 19 so that these shafts are driven in unison with the shaft of the motor. Each of the shafts 19 has a head 23 formed on the end thereof which head has a threaded stem 24 extending therefrom and upon which stem is placed a cutter 25 which cutter is driven at a high speed.

The ends of the arms 17 terminate in guards 26 which are recessed in one face to receive the cutters 25 and which guards are slotted as at 27 to form guides 28 for directing the course of the cutter against the stalk of sugar-cane or the like.

In using this device, a portable generator will be positioned to enable several operators equipped with this cutting device to operate in the surrounding zones and from said generator current will be supplied through a conductor 29 to the motors 21. It is apparent that the operator using this device can maintain an erect position and in cutting a stalk, with his free hand he grips the stalk then rocks the cutting device to cause the upper cutter to remove the upper portion of the stalk and by rocking the frame the lower cutter is brought into engagement with the base of the stalk when it is cut.

The cutters 25 may be of any type which may be cheaply made so that when dull from usage, they may be discarded, and for the different usages to which this device may be put, the cutters may be circular saws, sharpened disks or any other desired form.

Various modifications may be made within the scope of this invention without departing from the spirit thereof and the drawings are submitted for illustrative purposes only.

Having thus described my invention, I claim:

1. In a stalk cutter, a support, said support comprising a breastplate, straps for securing said breastplate to an operator, and an elongated frame fulcrumed to said breastplate, driven shafts carried by said frame, said driven shafts extending in opposite directions from the center of said elongated frame, a driving medium carried by said frame for said shafts, bearings formed on said frame for said shafts, recessed heads formed on the opposite ends of said frame, heads formed on said driven shafts, rotary cutters carried by said heads of said driven shafts, guides formed by the heads, formed on the ends of said frame, and means for moving said frame with respect to its support.

2. In a stalk cutter a breastplate to be carried by an operator, a frame fulcrumed thereto, said frame having extensions in opposite directions from the fulcrumed point a prime mover carried by said frame, shafts carried by said frame driven by said prime mover, cutters carried at the end of said shafts, and means for bringing the cutters into engagement with a stalk alternately.

In testimony whereof I affix my signature in presence of two witnesses.

JUAN G. CASTERAN.

Witnesses:
 GEORGE L. THOM,
 HUGO MOCK.

---

Copies of this patent may be obtained for five cents each, by addressing the " Commissioner of Patents, Washington, D. C."